United States Patent [19]

Weaver

[11] Patent Number: 5,179,781
[45] Date of Patent: Jan. 19, 1993

[54] PIPE CUTTING APPARATUS

[76] Inventor: Roger Weaver, 7471 Berea Rd., Winston, Ga. 30187

[21] Appl. No.: 819,983

[22] Filed: Jan. 13, 1992

[51] Int. Cl.⁵ .......................... B23D 21/06; B26D 3/16
[52] U.S. Cl. .............................................. 30/92; 30/96
[58] Field of Search ................ 30/92, 94, 95, 96, 182, 30/241; 83/862, 54, 310, 319

[56] References Cited

U.S. PATENT DOCUMENTS

| | | | |
|---|---|---|---|
| D. 255,642 | 7/1980 | Erpenbeck et al. | 30/96 |
| 2,933,810 | 4/1960 | Laval, Jr. | 30/96 |
| 3,822,471 | 7/1974 | Crowl | 30/92 |
| 3,965,571 | 6/1976 | Lyman | 30/92 |
| 4,063,355 | 12/1977 | Metzel | 30/96 |
| 4,114,266 | 9/1978 | Erpenbeck | 30/96 |
| 5,081,768 | 1/1992 | Brennan | 30/96 |

FOREIGN PATENT DOCUMENTS 2207377  2/1989  United Kingdom .................... 30/92

*Primary Examiner*—Douglas D. Watts
*Assistant Examiner*—Paul M. Heyrana
*Attorney, Agent, or Firm*—Leon Gilden

[57] ABSTRACT

A pipe cutting apparatus includes a semi-cylindrical support shell arranged to include a plurality of positioning flanges extending downwardly relative to the support shell to receive a pipe member therebetween. The positioning flanges include a saw guide slot diametrically directed through the semi-cylindrical support shell and medially of the positioning flanges to effect alignment and severing of an associated pipe. The elongate slot is of a predetermined length substantially equal to and at least the predetermined diameter of the support shell. Modifications of the invention include engaging flanges mounted in cooperation with the support shell to enhance manual grasping and engagement of the associated pipe. Further, securement straps are available to afford encompassing securement of a pipe contained within the support shell. A lubricant spray apparatus is available for use of lubrication of an associated saw during a cutting procedure.

1 Claim, 5 Drawing Sheets

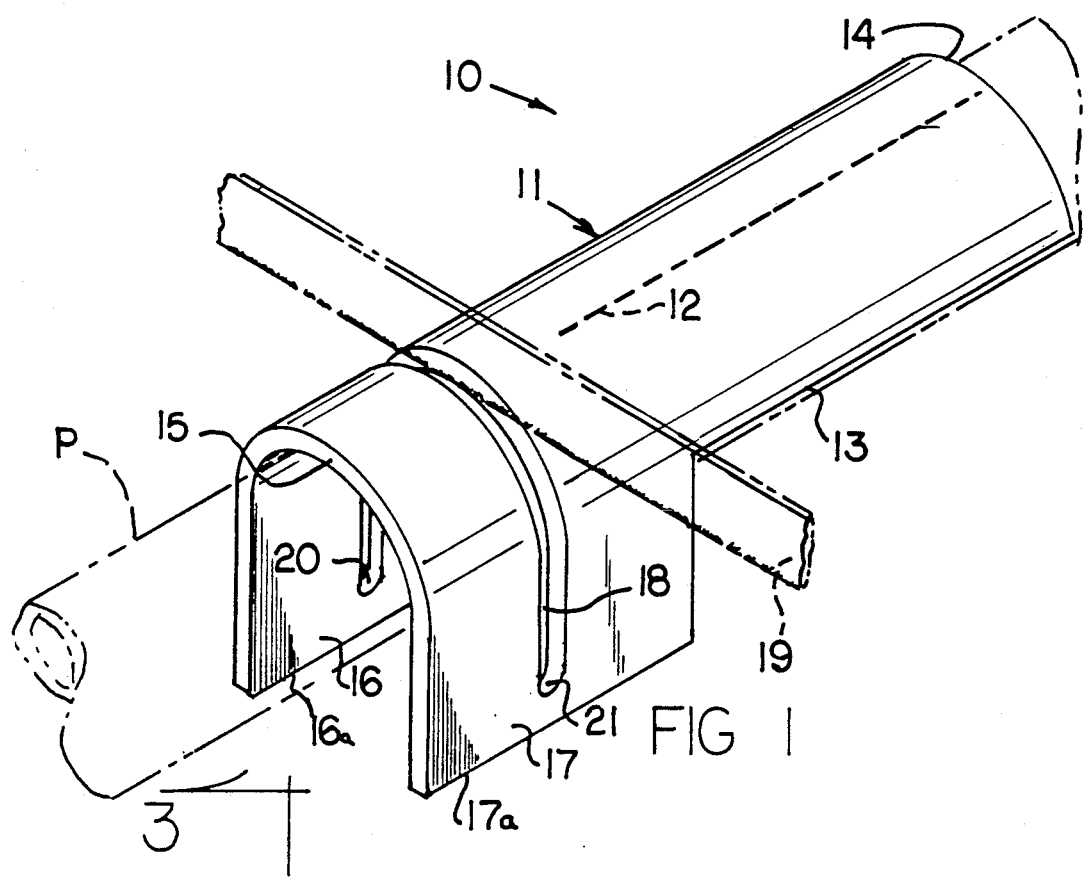
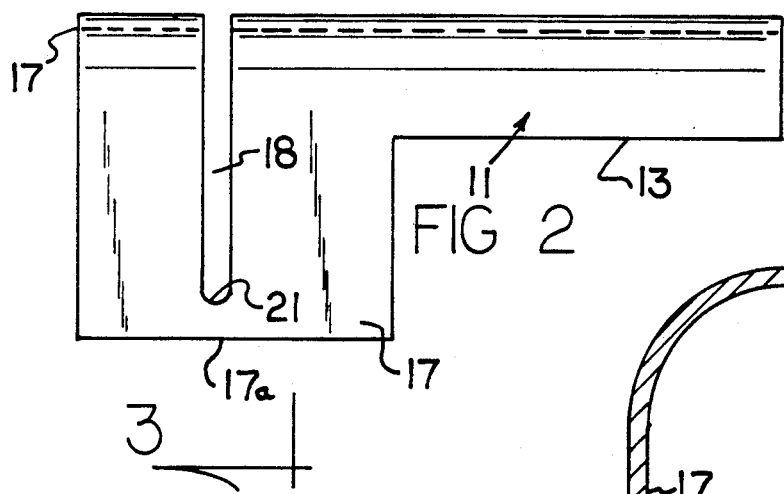
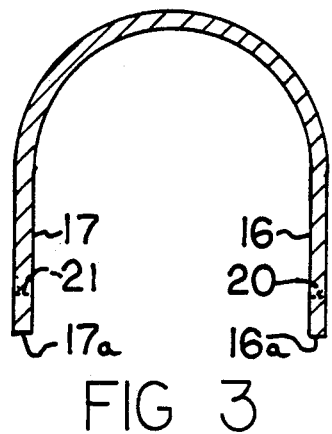

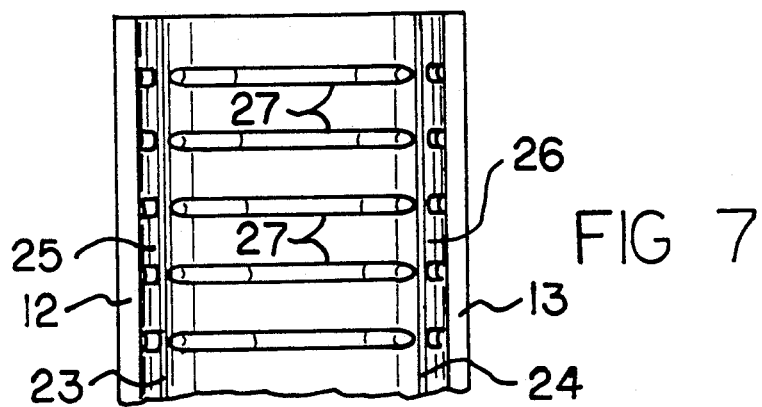
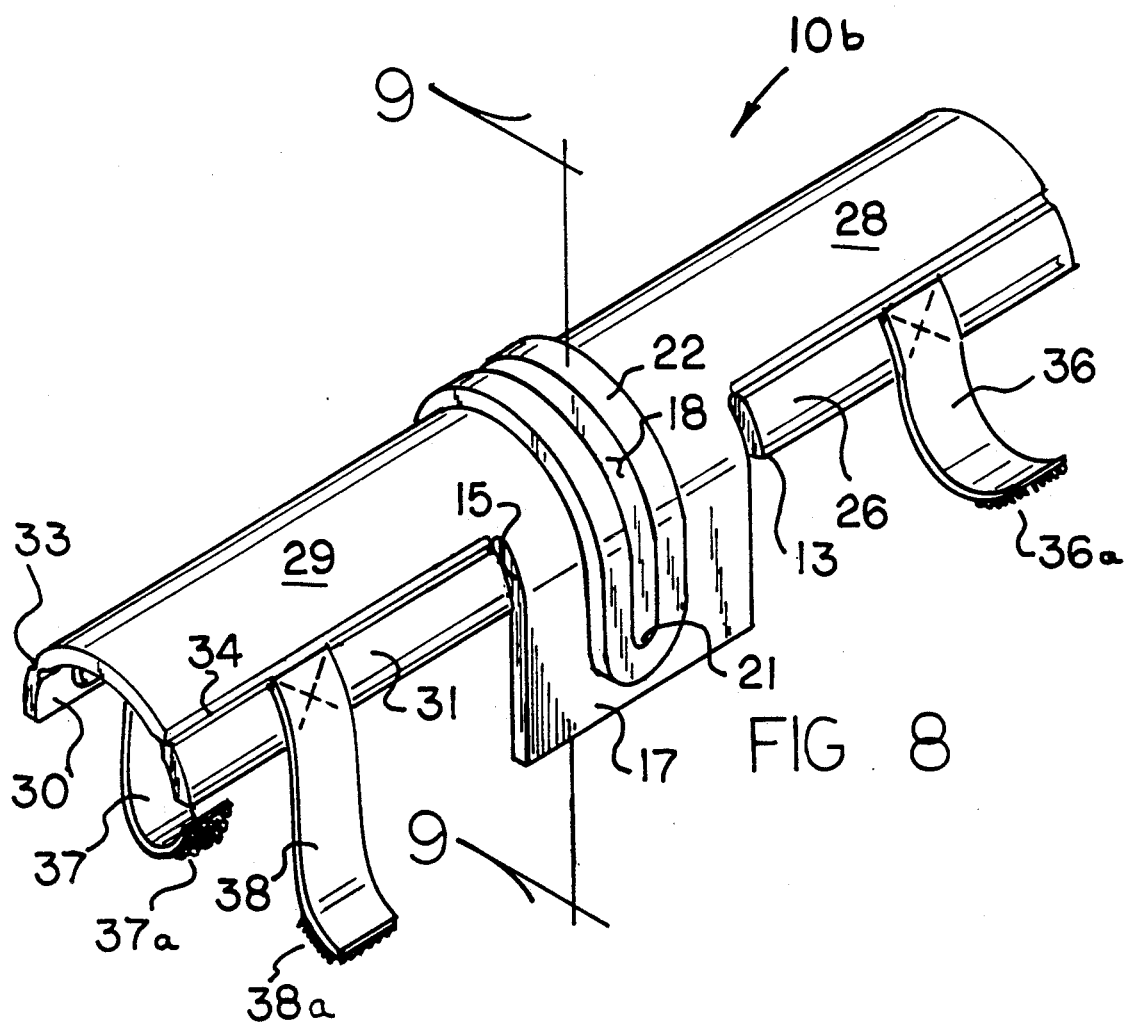

5,179,781

PIPE CUTTING APPARATUS

BACKGROUND OF THE INVENTION

1. Field of the Invention

The field of invention relates to pipe cutting apparatus, and more particularly pertains to a new and improved pipe cutting apparatus wherein the same is arranged to receive and provide guidance for a saw to be directed through the associated pipe workpiece.

2. Description of the Prior Art

Pipe cutters of various types are utilized throughout the prior art to provide for alignment and securement of a pipe during a pipe cutting procedure. Typically, such pipe cutting structure is of an elaborate and extensive construction minimizing its application to individual use. Such apparatus is exemplified in the U.S. Pat. No. 4,706,481 to Castricum including various control mechanisms relative to a cutting member relative to an associated pipe.

U.S. Pat. No. 4,845,849 to Aubriot sets forth a pipe cutter including a guided blade for cutting cylindrical pipe members, wherein the pipe cutter is arranged in association with an encompassing clamp structure for securing the pipe therewithin.

U.S. Pat. No. 4,966,061 to Riera, et al. sets forth a tube cutting apparatus to include a die jaw for cooperation with a severing blade to effect a cutting action relative to a tubular workpiece.

As such, it may be appreciated that there continues to be a need for a new and improved pipe cutting apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pipe cutting apparatus now present in the prior art, the present invention provides a pipe cutting apparatus wherein the same is arranged to receive a pipe member and effect its severing upon alignment of the pipe member relative to a guide slot of the apparatus. As such, the general purpose of the present invention, which will be described subsequently in greater detail, is to provide a new and improved pipe cutting apparatus which has all the advantages of the prior art pipe cutting apparatus and none of the disadvantages.

To attain this, the present invention provides a pipe cutting apparatus including a semi-cylindrical support shell arranged to include a plurality of positioning flanges extending downwardly relative to the support shell to receive a pipe member therebetween. The positioning flanges include a saw guide slot diametrically directed through the semi-cylindrical support shell and medially of the positioning flanges to effect alignment and severing of an associated pipe. The elongate slot is of a predetermined length substantially equal to and at least the predetermined diameter of the support shell. Modifications of the invention include engaging flanges mounted in cooperation with the support shell to enhance manual grasping and engagement of the associated pipe. Further, securement straps are available to afford encompassing securement of a pipe contained within the support shell. A lubricant spray apparatus is available for use of lubrication of an associated saw during a cutting procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe cutting apparatus which has all the advantages of the prior art pipe cutting apparatus and none of the disadvantages.

It is another object of the present invention to provide a new and improved pipe cutting apparatus which may be easily and efficiently manufactured and marketed.

It is a further object of the present invention to provide a new and improved pipe cutting apparatus which is of a durable and reliable construction.

An even further object of the present invention is to provide a new and improved pipe cutting apparatus which is susceptible of a low cost of manufacture with regard to both materials and labor, and which accordingly is then susceptible of low prices of sale to the consuming public, thereby making such pipe cutting apparatus economically available to the buying public.

Still yet another object of the present invention is to provide a new and improved pipe cutting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is an orthographic view, taken along the lines 3—3 of FIG. 2 in the direction indicated by the arrows.

FIG. 7 is an orthographic view, taken along the lines 7—7 of FIG. 6 in the direction indicated by the arrows.

FIG. 8 is an isometric illustration of a further modification of the invention.

DESCRIPTION OF THE PREFERRED EMBODIMENT

Figure 4:
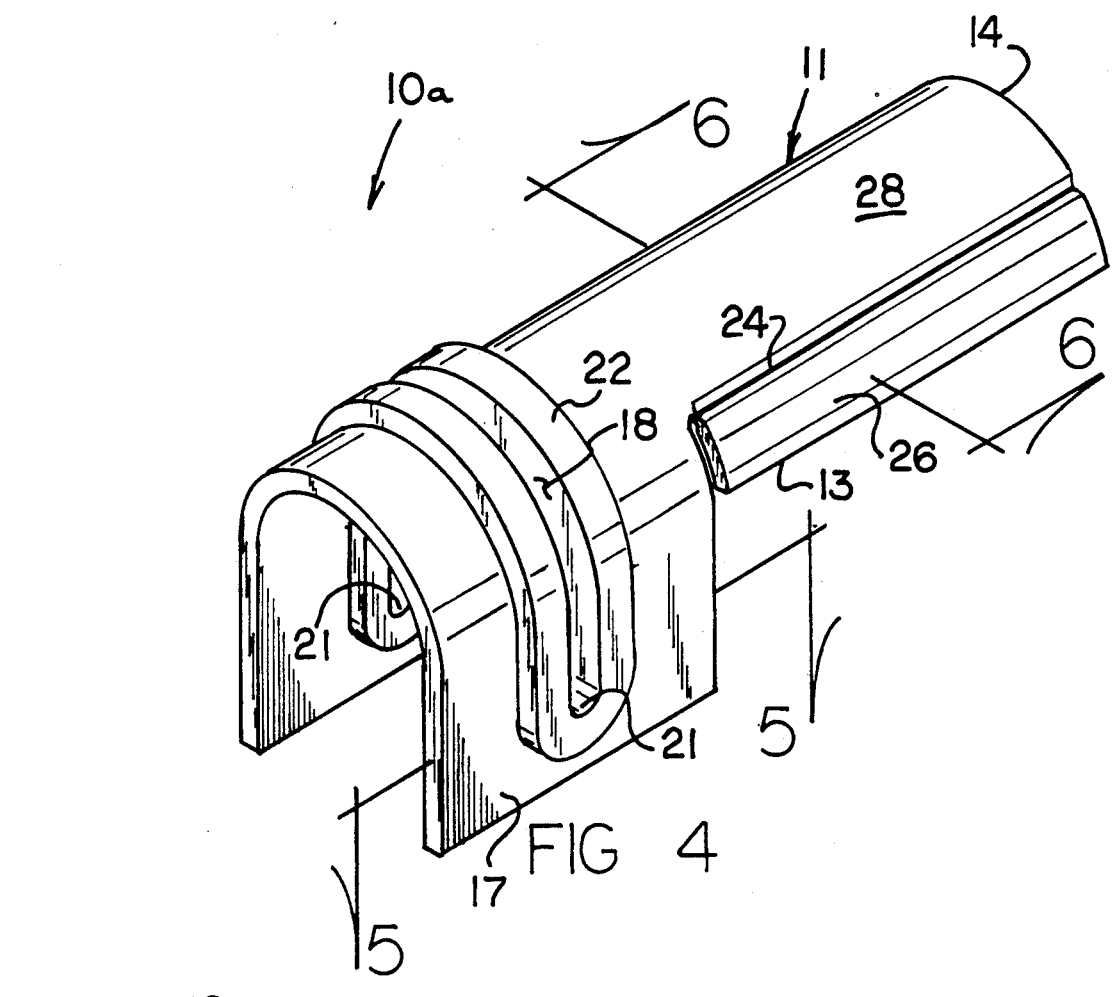
FIG. 4 is an isometric illustration of a modification of the invention.

With reference now to the drawings, and in particular to FIGS. 1 to 11 thereof, a new and improved pipe cutting apparatus embodying the principles and concepts of the present invention and generally designated by the reference numerals 10, 10a, 10b, and 10c will be described.

More specifically, the pipe cutting apparatus 10 of the instant invention essentially comprises a semi-cylindrical support shell 11 defined by a predetermined diameter to include a first edge 12 and a second edge 13 arranged in a substantially coplanar relationship diametrically directed through the support shell 11. The support shell includes a support shell semi-annular first end 14 spaced from a "U" shaped second end 15. A first and second positioning flange 16 are arranged in a parallel coextensive relationship relative to one another and extend below the first and second edges 12 and 13 respectively terminating in respective first and second free lower ends 16a and 17a. A saw guide slot diametrically directed through the shell 11 and medially of the first and second positioning flanges 16 and 17 extends a predetermined distance through the flanges substantially equal to or greater than the predetermined diameter of the shell and the associated pipe member "P" received within the shell. The slot 18 terminates in saw blade receiving slots first and second ends 20 and 21 and is arranged to receive a saw blade 19 therethrough in the cutting of the pipe "P" contained below the shell 11 and between the first and second positioning flanges 16 and 17.

Figure 5:
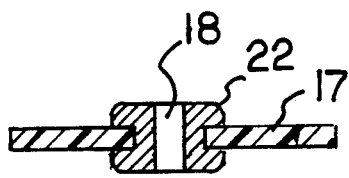
FIG. 5 is an orthographic view, taken along the lines 5—5 of FIG. 4 in the direction indicated by the arrows.
Figure 6:
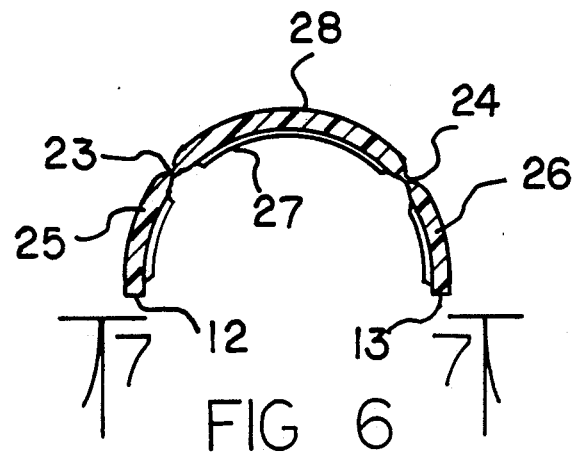
FIG. 6 is an orthographic view, taken along the lines 6—6 of FIG. 4 in the direction indirected by the arrows.

The apparatus 10a, as illustrated in the FIGS. 4-6 for example, includes the slot 18 formed with a continuous rigid slot perimeter guard coextensively arranged in surrounding relationship relative to the slot 18 minimizing damage in a cutting procedure relative to the apparatus and the associated shell 11 formed of a semi-flexible polymeric material. A first and second hinge 23 and 24 are oriented orthogonally relative to the slot 18 and extend from the respective first and second positioning flanges 16 and 17 terminating at the first end 14. The first and second hinges 23 and 24 include respective first and second arcuate engaging flanges 25 and 26 extending from the respective first and second hinges to the respective first and second edges 12 and 13. Parallel ribs 27 mounted to an interior surface of the shell 11 extend from the first engaging flange 25 to the second engaging flange 26 through the central semi-cylindrical segment 28 of the shell 11. The ribs are arranged as noted in a parallel relationship orthogonally oriented relative to the hinges 23 and 24.

Figure 9:
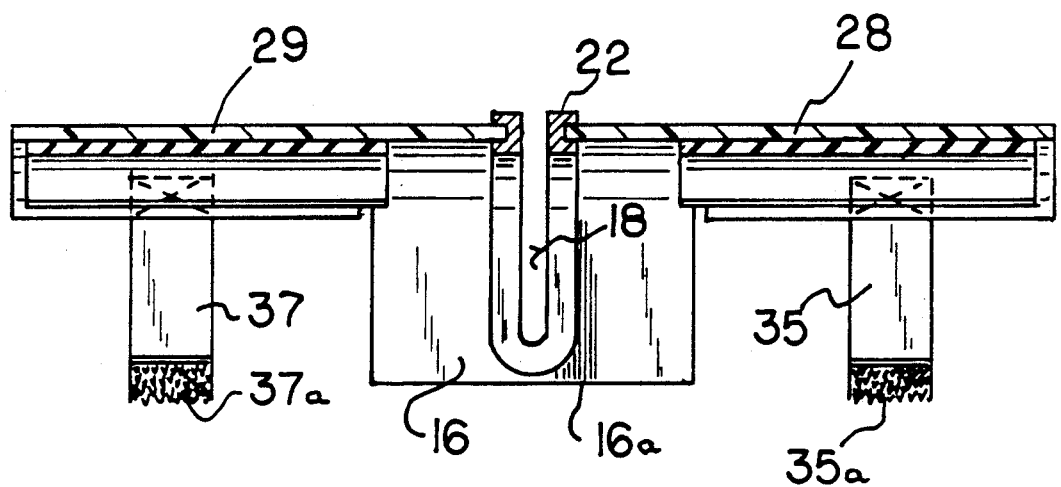
FIG. 9 is an orthographic view, taken along the lines 9—9 of FIG. 8 in the direction indicated by the arrows.

The embodiment 10b, as illustrated in the FIGS. 8 and 9, includes a second central semi-cylindrical segment 29 extending longitudinally relative to the first central semi-cylindrical segment 28. Respective third and fourth hinges 33 and 34 are arranged colinearly with the respective first and second hinges 23 and 24 and include respective second and third arcuate engaging flanges 30 and 31. A respective first, second, third, and fourth arcuate engaging flanges 25, 26, 30, and 31 include respective first, second, third, and fourth engaging straps 35, 36, 37, and 38. The respective engaging straps include respective first, second, third, and fourth fastener members, such as hook and loop fasteners, 35a, 36a, 37a, and 38a, wherein the first and second straps are arranged for securement relative to one another and the third and fourth engagement straps are arranged for securement relative to one another in surrounding relationship relative to a pipe member "P" to enhance securement of the pipe member "P" during a cutting procedure.

Figure 10:
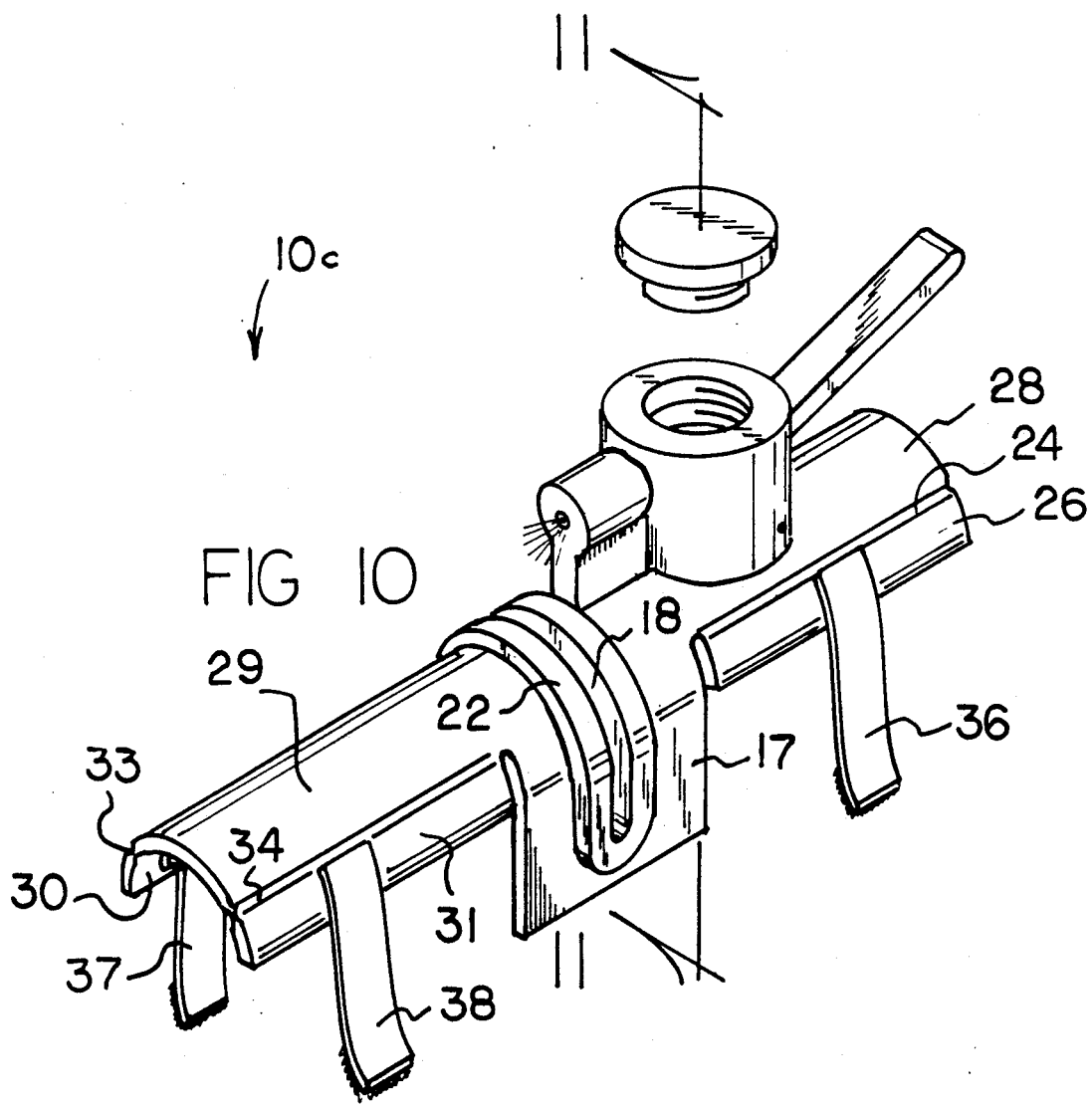
FIG. 10 is an isometric illustration of a further modification of the invention.
Figure 11:
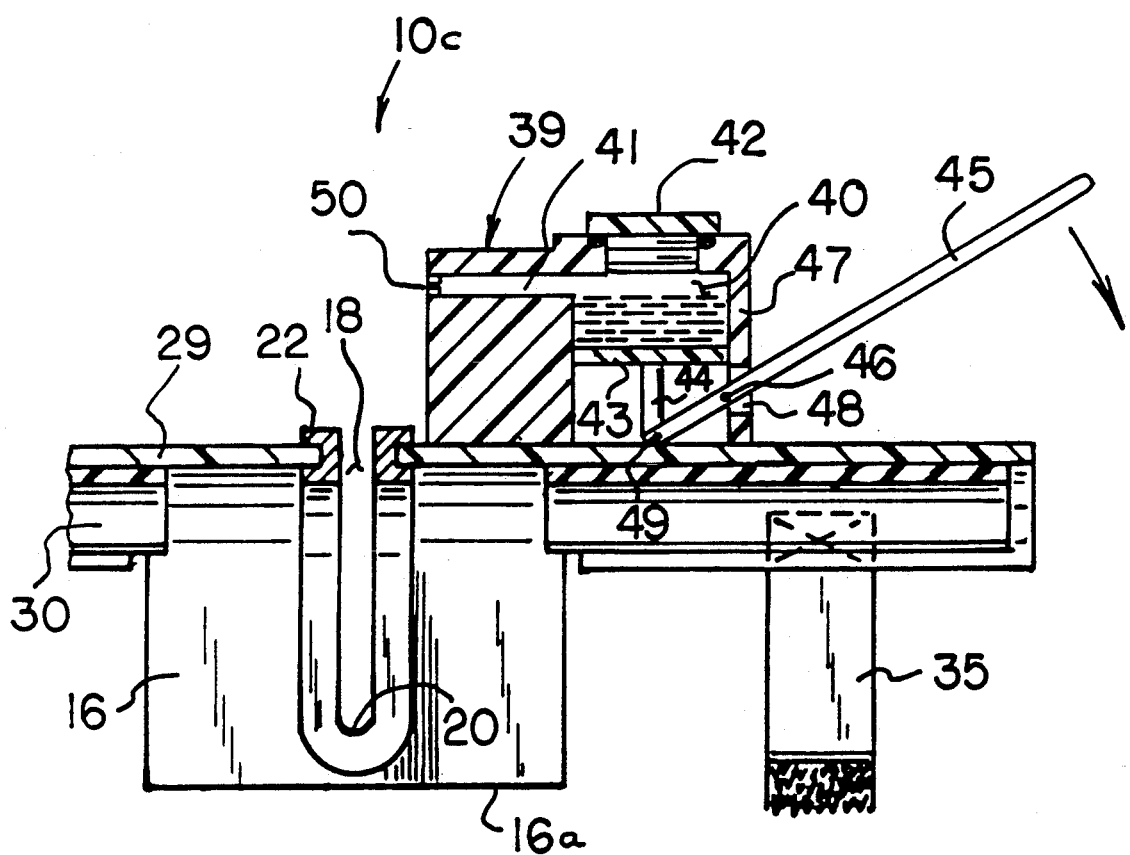
FIG. 11 is an orthographic view, taken along the lines 11—11 of FIG. 10 in the direction indicated by the arrows.

The apparatus 10c, as illustrated and exemplified in the FIGS. 10 and 11, further includes in addition to the organization 10b a reservoir housing 39 mounted to the first central semi-cylindrical segment 28 that includes a reservoir 40 in fluid communication with a reservoir conduit 41 within the housing 39. A fill cap 42 over the reservoir 40 permits filling of the reservoir 40 with a lubricant for application against the saw blade 19 during a cutting procedure. The reservoir 40 terminates in a piston floor 43 reciprocatable relative to the reservoir 40 and is fixedly mounted to an upper distal end of a piston rod 44. A lower distal end of the piston rod 44 is pivotally mounted to an actuator lever 45 about an actuator lever second axle 49. The actuator lever 45 is pivotally mounted about a first axle 46 adjacent a housing rear wall opening 48 of a housing rear wall 47 of the reservoir housing 39. Pivotment of the actuator lever 45 effects projection of the piston 43 towards the fill cap 42 and simultaneous projection of the lubricant fluid through the conduit 41 and exiting the conduit 41 through a conduit spray nozzle 50 that is positioned above and adjacent the slot 18 to lubricate the saw blade 19 during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pipe cutting apparatus, comprising,
   a semi-cylindrical support shell, the semi-cylindrical support shell defined by a predetermined diameter and including a first semi-annular end spaced from a generally "U" shaped second end, the support shell including spaced coplanar first and second support shell edges, the support shell is defined by a first length and the first and second support shell edges are defined by a second length less than the first length, wherein the support shell further includes a first and second positioning flange extending in a coplanar parallel relationship relative to one another and extending from the "U" shaped second end to the first and second support shell edges, the first and second positioning flanges terminate in respective first and second free lower ends that are spaced below the respective first and second support shell edges, and
   a saw guide slot diametrically directed through the support shell and through the first and second positioning flanges, wherein the saw guide slot terminates in respective first and second slot ends spaced from the second first and second free lower ends of the respective first and second positioning flanges, and a saw blade arranged for reception within the saw guide slots, and
   the saw guide slot is orthogonally oriented relative to the first and second support shell edges, and
   the saw guide slot includes a rigid continuous slot perimeter guard extending coextensively and in surrounding relationship relative to the saw guide slot, and
   a respective first and second hinge coextensive with and parallel to the respective first and second support shell edges and spaced from the first and second support shell edges within the support shell, and a first arcuate engaging flange extends from the first hinge to the first support shell edge, and a second arcuate engaging flange extends from the second hinge to the second support shell edge, and including a series of spaced parallel engaging ribs fixedly mounted within the semi-cylindrical shell, wherein the ribs are orthogonally oriented relative to the first and second hinges, and the ribs are arranged coextensively between the first support shell edge to the second support shell edge, and
   the support shell defines a first central semi-cylindrical segment extending between the first hinge and the second hinge, and further including a second central semi-cylindrical segment longitudinally aligned with the first central semi-cylindrical segment extending from the second end of the support shell, and a third hinge and a fourth hinge are respectively mounted to opposed ends of the second central semi-cylindrical segment, wherein the third hinge is colinear with the first hinge and the fourth hinge is colinear with the second hinge, and the third arcuate engaging flange extends from the third hinge and is hingedly mounted thereto, and a fourth arcuate engaging flange is mounted to the fourth hinge and extends downwardly therefrom, and a first engaging strap secured to the first arcuate engaging flange, a second engaging strap mounted to the second arcuate engaging flange, a third engaging strap mounted to the third arcuate engaging flange, and a fourth arcuate engaging strap mounted to the fourth arcuate engaging flange, and each engaging strap includes a fastener mounted at a free end thereof permitting securement of the first engaging strap to the second engaging strap and the third engaging strap to the fourth engaging strap to permit securement and surrounding relationship relative to a pipe member received within the support shell, and
   a reservoir housing mounted to the first central semi-cylindrical segment, the reservoir housing includes a fluid reservoir contained therewithin, and the fluid reservoir includes a fluid conduit in fluid communication with the fluid reservoir, and a fill cap directed through the reservoir housing permitting replenishment of the fluid reservoir with a lubricant fluid, and the fluid reservoir includes a piston floor movably mounted relative to the reservoir housing, the piston floor includes a piston rod, the piston floor fixedly mounted to an upper distal end of the piston rod, and an actuator lever, the actuator lever pivotally mounted to a lower distal end of the piston rod about a second axle, and the reservoir housing including a rear wall, the rear wall including a rear wall opening, and the actuator lever extending through the rear wall opening, and the actuator lever including a first axle pivotally mounting the actuator lever adjacent the rear wall, and the fluid conduit terminates in the conduit spray nozzle, the conduit spray nozzle positioned above and adjacent the saw guide slot and the saw blade to permit projection of the lubricant fluid from the fluid reservoir onto the saw blade during a cutting procedure.

* * * * *